US006405918B1

United States Patent
Claridge et al.

(12) 
(10) Patent No.: US 6,405,918 B1
(45) Date of Patent: Jun. 18, 2002

(54) MECHANICAL RETENTION SYSTEM FOR BRAZE AND SOLDER JOINTS

(75) Inventors: Rex C. Claridge, Redondo Beach; Christopher M. Adams, El Segundo; Annetta J. Luevano, Los Angeles; Loren E. Record, Hawthorne, all of CA (US)

(73) Assignee: TRW Inc., Redondo Beach, CA (US)

( * ) Notice: Subject to any disclaimer, the term of this patent is extended or adjusted under 35 U.S.C. 154(b) by 59 days.

(21) Appl. No.: 09/699,825

(22) Filed: Oct. 30, 2000

(51) Int. Cl.[7] .................... B23K 31/02; B23K 5/22; B23K 31/12
(52) U.S. Cl. ............... 228/121; 228/213; 228/252; 228/255
(58) Field of Search ............... 228/121, 212, 228/213, 215, 216, 245, 248.1, 249, 250, 252, 255

(56) References Cited

U.S. PATENT DOCUMENTS

| | | | | |
|---|---|---|---|---|
| 1,886,615 A | * | 11/1932 | Johnson | 228/118 |
| 4,032,057 A | * | 6/1977 | Linscott, Jr. | 228/212 |
| 4,457,467 A | * | 7/1984 | Klement et al. | 228/103 |
| 4,527,046 A | * | 7/1985 | Asonen | 219/137 R |
| 5,412,176 A | * | 5/1995 | Keenan | 219/137 R |
| 5,952,042 A | * | 9/1999 | Rafferty et al. | 156/94 |

* cited by examiner

*Primary Examiner*—Tom Dunn
*Assistant Examiner*—Colleen P Cooke
(74) *Attorney, Agent, or Firm*—Ronald M. Goldman

(57) ABSTRACT

Brazing or soldering of pieces of low wettable materials (1, 3), such as single crystal silicon, is accomplished by sandwiching the brazing material (5) between the pieces and sealing the edges of the brazing material with a tape (11) wrapped about the periphery of the brazing material, mechanically placing that tape in compression and maintaining that compression while heating (21) the sandwiched assembly to the brazing temperature of the brazing material. The tape possesses the characteristic of being non-wettable by the brazing material in the molten state and, hence, is impermeable to that melt. The tape may comprise a fibrous porous ceramic material.

13 Claims, 2 Drawing Sheets

MECHANICAL RETENTION SYSTEM FOR BRAZE AND SOLDER JOINTS

STATEMENT OF GOVERNMENT RIGHTS

This invention was made with Government support under Contract No. SDIO-84-92-C-0002 awarded by the US Air Force. The government has certain rights in this invention.

FIELD OF THE INVENTION

This invention relates to brazing and soldering processes and, more particularly, to the formation of vertically oriented brazements in low-wetting materials, particularly in single crystal silicon.

BACKGROUND

Brazing is a method of joining metals and other materials though application of heat and a brazing filler metal to such metals and other materials. The filler metal is dissimilar to the materials being joined together in the brazement and possesses a melting temperature above 840 degrees F., but below the melting temperature of the metals or materials being joined. As example, with the filler positioned between the two surfaces to be joined, the temperature is raised to the melting temperature of the filler, the brazing temperature, but below the melting temperature of the material of the joining surfaces. The filler becomes molten, wets the adjacent surfaces of the joining materials, and fills the gap between those adjacent surfaces. As another example, braze material is placed at the entrance to the joint, the temperature is raised to the melting temperature of the filler, the brazing temperature, but below the melting temperature of the material of the joining surfaces. The filler becomes molten, wets the adjacent surfaces of the joining materials, and, through capillary action, is drawn in to the gap between those adjacent surfaces. In either procedure, when cooled, the brazing material re-solidifies and forms a strong metallurgical bond with the joined materials at the juncture, the brazement or braze joint. That bonding occurs at the molecular level. A properly constructed braze joint provides a high degree of serviceability under concentrated stress, vibration, and temperature loads.

Soldering is similar to brazing. The difference is that the filler material for soldering (eg. the solder) is a metal or metal alloy that has a lower melting temperature than brazing material. Typically, the solder is not as strong as brazing material and does not produce a bond that is as strong as that produced by brazing material. The present invention is directed to brazing and soldering processes. Hence, it should be understood that when reference is made herein to brazing, the term is intended to also encompass and include soldering, even if explicit reference is not made to solder or soldering.

Known brazing materials include pure metals, such as copper, gold and silver and complex alloys of aluminum, gold, nickel, magnesium, cobalt, silver and palladium, as example. No single one of those filler materials is of universal application in brazing.

The two basic braze joint designs are the lap joint and the butt joint. In the lap joint a portion of one surface overlaps a portion of another surface, and the brazement is formed in the region of overlap. In the butt joint, the two materials to be joined contain end surfaces that are butted against one another. The present invention is applicable to the formation of both such braze joints. More particularly, the invention is applicable to joining two surface regions of like shape and size in which the joint or bond line between the two surfaces is accessible for wrapping in the manner later herein described.

In certain circumstances the brazing of a butt joint is performed with the juncture between the materials to be joined being vertically oriented. In that situation, the capillary in-draw of the molten brazing or soldering metal in-between the close fitting butted surfaces of the parts to be joined typically occurs with inconsequential melting of the joined materials and, when the materials are cooled down and the filler solidifies, a strong vertically oriented braze or solder joint is formed between those parts.

Capillary in-draw serves as a good indicator of the ability of a braze material to wet the materials that are to be brazed together. If for a given joint material, it is found that the molten braze material is not drawn into the gap between the close fitting surfaces of the joint in more than an insignificant amount, the joint material is said to be "low-wetting" in the context of the present invention. If the materials to be brazed together are low-wetting, then a braze joint cannot be formed in the foregoing process. As example, silicon is a material that is low-wetting. As an advantage, the present invention accomplishes satisfactory brazing of low-wetting materials, such as silicon.

A flux is sometimes used in the brazing or soldering process to clean the surfaces of the joining material of oxides and or other impurities that inhibit the wetting of the surfaces of the joining material by the molten filler. Other brazing and soldering processes do not incorporate the application of a flux to the joining materials and is called "fluxless" brazing (or soldering). For reasons not here material, the chemical ingredients that function as the flux are typically undesirable and are not used so as to avoid chemical damage to the joining surfaces or to avoid environmental issues. The present invention also has application to fluxless brazing or soldering.

Fluxless brazing of silicon (and other materials that are either chemically reactive with the filler or possess a non-wettable surface) present special challenges. The surface oxide that naturally forms on the silicon crystal inhibits the molten filler from wetting of the crystal surfaces and, hence, inhibits capillary flow of the molten filler, while penetration of the molten filler through cracks that inherently form in the surface oxide of the silicon crystal results in eutectic melting. As X-ray inspection and microscopic examination reveals, the result is that capillary retention of the brazing or soldering material in the bond line is poor, and bond line porosity is higher than desired. Although a braze joint is formed in the silicon crystal that is useful for some applications, the joint lacks the uniformity and strength common to braze joints produced in metals and is regarded as being of low quality. The present invention provides the method and means to improve the quality of a vertically oriented braze joint produced in silicon and like materials.

Accordingly, a principal object of the present invention is to provide a method of brazing of low-wetting materials.

Another object of the invention is to produce high quality brazing and soldering of single crystal silicon material.

A further object of the present invention is the production of high quality vertically oriented braze and solder joints in materials having low-wetting characteristics.

SUMMARY OF THE INVENTION

The foregoing objects and advantages are realized by a new method of brazing of pieces of low wetting materials, such as single crystal silicon, that is accomplished by sandwiching the brazing material between the pieces and sealing the edges of the brazing material with a tape wrapped about the periphery of the brazing material, mechanically placing that tape in compression and maintaining that compression while heating the sandwiched assembly to the brazing temperature of the brazing material. The tape possesses the characteristic of being non-wettable or non-wetting by the brazing material in the molten state and, hence, is impermeable to that molten material. In accordance with a more specific aspect to the invention, the foregoing tape may be of a fibrous porous ceramic material.

The foregoing and additional objects and advantages of the invention together with the structure characteristic thereof, which was only briefly summarized in the foregoing passages, will become more apparent to those skilled in the art upon reading the detailed description of a preferred embodiment of the invention, which follows in this specification, taken together with the illustrations thereof presented in the accompanying drawings.

DETAILED DESCRIPTION OF THE PREFERRED EMBODIMENTS

Figure 1A:
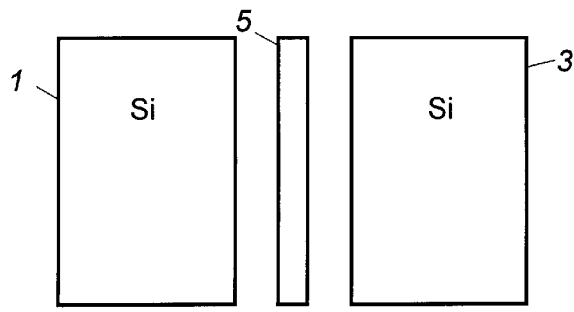
FIGS. 1A–1D pictorially illustrates various stages in the brazement of two parts using the new brazing method.

Reference is first made to FIGS. 1A–1D, which may be considered together. The two parts that are to be joined together by brazing are illustrated in FIG. 1A in an end view as rectangular slabs 1 and 3 of single crystal silicon. The adjoining faces of those slabs are flat, straight and in parallel with one another. The brazing material 5 is placed in between the two faces. The brazing material is a relatively thin layer as seen from the side view in FIG. 1A. Both the adjoining faces of slabs 1 and 3 and the sides of brazing material 5 are essentially of the same area, not visible in this side view, so as to form a generally even outer surface to the assembled sandwich of joint components.

Figure 1B:
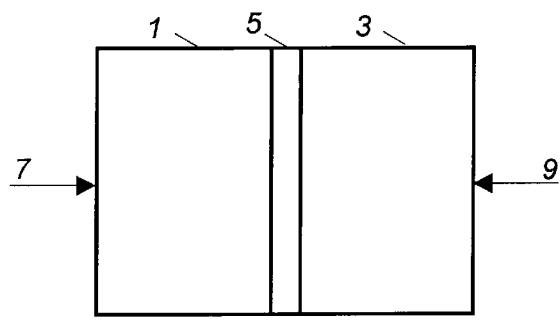

The three components are sandwiched together as illustrated in FIG. 1B. Those parts are held in the sandwiched relationship by application of a compressive force between the outer sides of the two slabs, as represented by the arrows 7 and 9. Such a force may be exerted by clamps, not illustrated.

The clamps should be thermally compensated as necessary if the thermal expansion characteristics of the clamps are not the same as that of the material of the slabs, here silicon, so that the clamping pressure is retained when the entire assembly is raised to the brazing temperature as described later elsewhere herein. The edges of the brazing material defines a seam that extends all the way around the sandwich assembly.

Figure 1D:
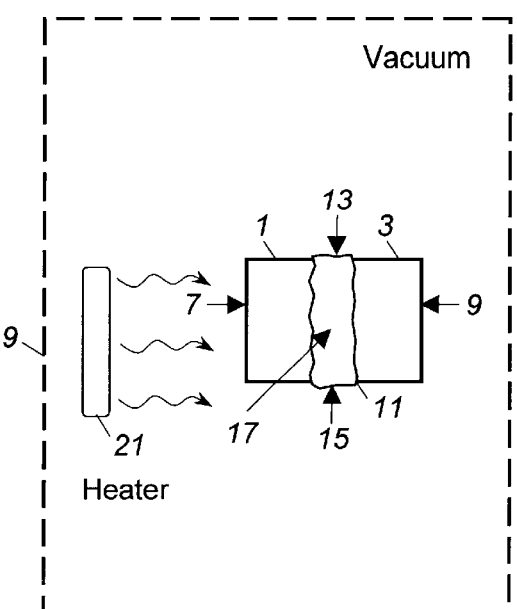
Figure 1C:
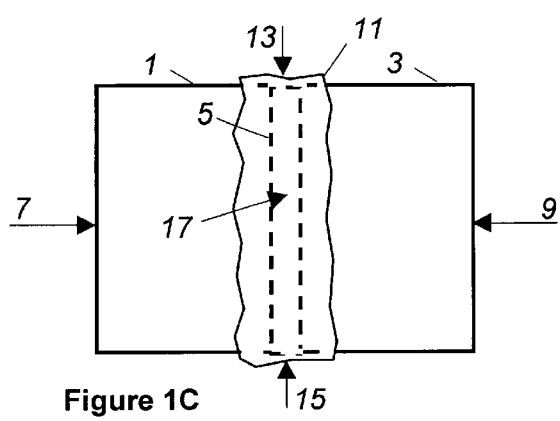

Thereafter, as shown in FIG. 1C, the seam formed by brazing material 5 is sealed. The seal is formed of a tape or, as variously termed, ribbon 11 that is made of material that is impermeable to the molten brazing material, and that ribbon is tightly held, compressed, against the edge of the brazing material and adjacent portions of the two slabs. The seal extends about the periphery of the seam in a closed loop, 360 degrees, covering the brazing material and, being wider than the seam, also covers adjacent portions of the two slabs. The sealing material is first wrapped around the edge of the joint overlying the bonding line. Then the sealing material is pressed against all sides of the slabs as represented by the arrows 13, 15 and 17 as well as another pressing force, not visible in the figure, applied on the edge of the slabs opposite to pressing force 17.

The mechanical pressing force on the ribbon 11 may be provided by clamps applied to the opposite edges of the seam or by a strap that is wrapped around the seam line and fastened. The clamps or strap used to compress the ribbon against the seam should be thermally compensated as necessary if the thermal expansion characteristics of the clamps and/or straps are not the same as that of the material of the slabs, here silicon, so that the clamping pressure is maintained when the entire assembly is raised to the brazing temperature as described later elsewhere herein.

The material of the compliant seal is selected to provide an impermeable barrier that is not wetted by the molten filler material. The seal support is one that maintains a firm mechanical pressure on the seal, pressing the seal against the edge of the materials to be joined, throughout the time and temperature that the filler is molten despite differences in thermal expansion of the components to the sandwiched assembly.

The foregoing clamped sandwiched edge sealed assembly is then placed in a vacuum heating chamber 19, illustrated in FIG. 1D. The chamber is evacuated of air and a source of radiant heat is activated. Other heating chambers having neutral or reducing atmospheres can also be used for this purpose. After a period of time the radiant heat raises the temperature of the entire assembly to the brazing temperature of the covered brazing material 5, while the assemblies remain sandwiched and the ribbon remains in compression against the two pieces being brazed. The brazing material becomes molten at that temperature. Because the seam formed by the brazing material in the sandwich is sealed, the brazing material is restricted from escaping from the joint. The assembly is held at the brazing temperature for only a few minutes until the brazing material becomes molten, which is all the time necessary to complete the braze joint. When the radiant heat is terminated, the heat is dissipated from the assembly and the brazing material re-solidifies and forms the bond between the two silicon slabs. The two slabs of silicon are successfully joined together in a unitary assembly.

Figure 2:
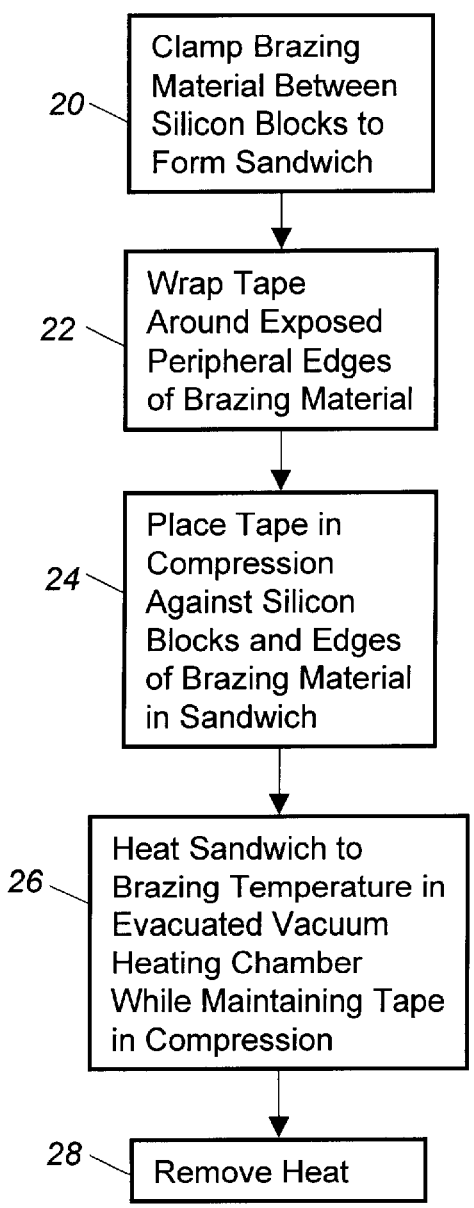
FIG. 2 illustrates the new method of sealed brazing.

The foregoing steps are illustrated in FIG. 2 in block form to which reference is made. The silicon pieces to be brazed together and sheet of brazing material are clamped together in a sandwich 20. Then the tape is wound around the periphery of the edge of the sheet of brazing material 22. The tape is placed in compression against the sandwich assembly, as represented at 24, completing the seal, which serves as a mechanical restraint to the escape of brazing material during heating. The sandwich assembly is heated to the brazing temperature of the brazing material, preferably in an evacuated vacuum chamber 26, while maintaining the mechanical force on the tape and maintaining the sandwich configuration. Thereafter the heating is terminated and the sandwich assembly is allowed to cool or is removed from the chamber and is cooled to remove the added heat from the sandwich. The result is a high quality braze of the silicon slabs.

In a practical embodiment the impermeable wrapping material or tape for the process is a fibrous ceramic tape sold under the brand name Fiberfrax tm, a ceramic felt-like material which has been used as a furnace insulation. The tape is somewhat like a cushion and is compressible. That characteristic permits the tape to act like a soft gasket that can be compressed to conform to any minor irregularity in the shape of the adjoining pieces. The tape is fibrous and is porous. Even though fibrous and porous, the brazing alloy does not "wet" the ceramic material of the tape. Hence, there is no wicking action of the molten metal. The tape, thus, is impermeable to the molten metal and cannot escape from the assembly.

Appropriate brazing materials for the foregoing process of joining the silicon parts are a copper-silver alloy, such as CuSil brand available from the Wesgo company, a copper-silver alloy containing a small amount of titanium, such as the CuSil ABA brand available from Wesgo; silver; copper; gold; gold-silicon alloy; and aluminum. In an application in which single crystal silicon as previously described was brazed, the CuSil brand copper silver alloy appeared to be preferred for the brazing material. In other applications other brazing material may be preferred.

Figure 3A:
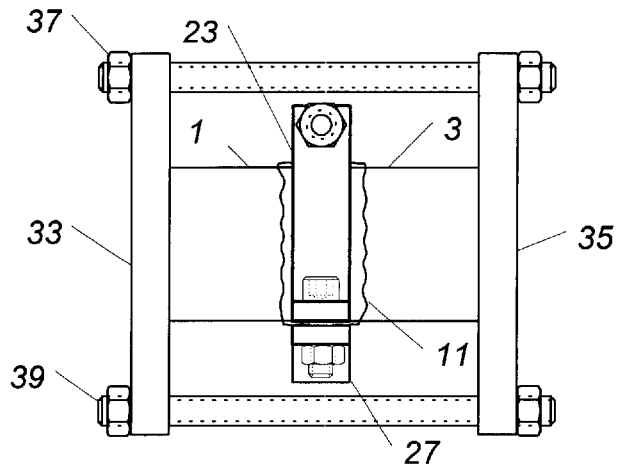
FIGS. 3A and 3B pictorially illustrate a clamping system suitable for the practice of the new method.
Figure 3B:
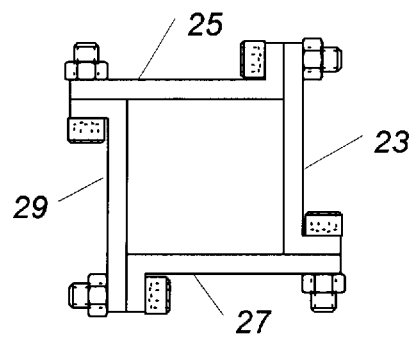

In the preceding description, the compressive force was symbolically illustrated. Although it is understood that those skilled in the art well know the jigs and/or fixtures for providing those forces, an illustration may be helpful nonetheless. An example of a clamping system is illustrated in FIGS. 3A and 3B to which reference is made. The wrapped sandwich assembly for the braze is shown in FIG. 3A including silicon slabs 1 and 3. The tape 11 which wraps the peripheral edge of the brazing material, not visible, is represented by wavy lines. The tape is covered by a clamping block 23 on the front side, and by like clamping blocks 25, 27, and 29 on the top, bottom and rear sides of the sandwich assembly, as shown in FIG. 3B in separate detail. Tightening of screws connecting these clamping blocks at the ends provides the force on the blocks to provide the compressive force on all portions of tape 11.

Lastly, the sandwich assembly is held together by clamping members 33 and 35 and clamping screws 37 and 39. These clamps enter from the right and left hand sides in the figure. It should be appreciated that each clamping arrangement does not obstruct or interfere with one another. The foregoing is understood to be an example. Other clamping structures may be designed for this and other braze joints.

Figure 4A:
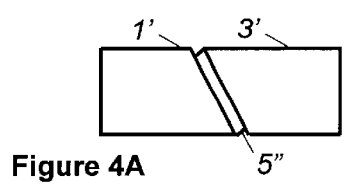
FIGS. 4A and 4B pictorially illustrate other brazements to which the invention may be practiced.

The braze joint of the foregoing embodiment of a butt joint was constructed from pieces having ends that were oriented at right angles to the axis of the piece. As one appreciates in other embodiments, the ends of the pieces may be oriented at other than right angles to the axis of the piece, all of which fall within the scope of the present invention. As example, FIG. 4A shows pieces 1' and 3' whose end faces are parallel but are inclined to the axis of the piece. For convenience, the elements of this figure are given the same numerical designation as the corresponding element of the embodiment of FIG. 1, with that designation being primed. The brazing material 5' is sandwiched between the two pieces.

Figure 4B:
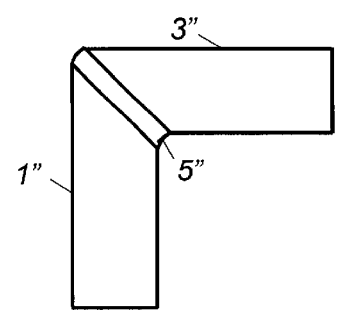

Another sandwich assembly is shown in FIG. 4B in which the axis of the two pieces 1" and 3" are at right angles to one another and the ends of those pieces that are to be butted together are inclined at an angle to the axis of the respective piece. The brazing material 5" is sandwiched between those ends of pieces 1" and 3". The application of the impermeable compressible tape over the brazing material is obviously more difficult with this joint. Likewise the clamping or strapping arrangement by which the tape is compressed against the edge of the brazing material and the pieces is obviously more complex mechanically than that use in the embodiment of FIG. 1. As one appreciates all of the foregoing examples fall within the scope of the present invention.

Although the foregoing method has principal advantage for the brazing of materials that are low-wetting by the molten brazing material, it should be understood that the method is not restricted or limited to such low-wetting materials. The method may be used for brazing wetted materials as well, although no advantage is offered.

It should also be understood that the term low-wetting as used herein in connection with a material encompasses those materials that are regarded as non-wetting in the classical sense, and some materials that are regarded as wetting in the classical sense. Non-wetting in the classical sense is indicated by the contact angle produced between the surface of a sheet of the material to be brazed and the tangent of the profile of a molten droplet placed on that surface, at the point of contact of the molten droplet with that surface, for a given atmosphere. When that angle is equal to or greater than ninety degrees, the material to be brazed is said to be non-wetting; if under ninety degrees, then the material is regarded as wetting. As an example, if a molten droplet of brazing material remains essentially "balled-up" on the surface of the material, then the latter material is non-wetting. In experiments it was found that some materials thought to be wetting in accordance with the foregoing definition, as example, a material with a tangent angle of forty degrees as measured at the completion of the braze cycle, failed to produce sufficient capillary action and a good braze joint. The latter material failed to braze properly using known brazing techniques, but may be brazed by the disclosed sealing method. Hence, the latter material is regarded as low-wetting in the context of the present invention.

The exact demarcation between a wetting material, as would not require the sealing method to successfully braze pieces of that material together and a low wetting material that does require the method to braze thus cannot be defined with certitude; and the meaning, of necessity, is based on the results obtained.

It is found that capillary in-draw serves as a good indicator of the ability of a braze material to wet the materials that are to be brazed together, and may be used to determine if a material to be brazed is low wetting in the present context. If for a given joint material, it is found that the molten braze material is not drawn into the gap between the close fitting surfaces of the joint in more than an insignificant amount, the joint material is regarded as low-wetting in the context of the present invention. If the materials to be brazed together are low-wetting, then a satisfactory braze joint cannot be formed using the capillary braze procedure of the prior art.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus, the invention is to be broadly construed within the full scope of the appended claims.

What is claimed is:

1. The method of brazing two pieces of material together with brazing material, comprising the steps of:
   sandwiching the brazing material between the two pieces of material to define a seam between said two pieces of material, said seam extending in a closed loop about the periphery of said two pieces;
   holding the two pieces of material and said brazing material in said sandwiched relationship;
   applying a covering seal about the periphery of the seam, said covering seal being wider in dimension than the thickness of said seam;

compressing said seal against said seam to place said seal in compression and maintaining said compression to define an edge sealed sandwich assembly;

heating said edge sealed sandwich assembly to the brazing temperature of said brazing material for a predetermined interval to change the brazing material to a molten state;

withdrawing heat from said edge sealed sandwich assembly, whereby said edge sealed sandwich assembly falls below said brazing temperature, wherein said brazing material re-solidifies and bonds to the adjoining pieces to form a braze joint;

decompressing and removing said covering seal, whereby said pieces are brazed together in a unitary assembly.

2. The method of brazing two pieces of material together with brazing material as defined in claim 1, wherein said seal comprises a material that is impermeable to molten brazing material and is compliant and compressible in characteristic.

3. The method of brazing two pieces of material together with brazing material as defined in claim 1, wherein said seal comprises a compliant fibrous ceramic material.

4. The method of brazing two pieces of material together with brazing material as defined in claim 1, wherein said seal comprises a ribbon of compliant fibrous ceramic material.

5. The method of brazing two pieces of material together with brazing material as defined in claim 1, wherein each of said two pieces comprise: a material that is not readily wetted by said molten braze material.

6. The method of brazing two pieces of material together with brazing material as defined in claim 5, wherein said material that is not readily wetted by said molten braze material comprises a crystalline material.

7. The method of brazing two pieces of material together with brazing material as defined in claim 6, wherein said crystalline material further comprises single crystal silicon.

8. The method of brazing two pieces of material together with brazing material as defined in claim 4, wherein each of said two pieces comprise single crystal silicon.

9. The method of brazing two pieces of material together with brazing material as defined in claim 1, wherein said step of heating further comprises the steps of:

placing said edge sealed sandwich assembly in a chamber;

evacuating said chamber of air; and applying radiant energy to said edge sealed sandwich assembly.

10. The method of brazing two pieces of material together with brazing material as defined in claim 7, wherein said seal comprises a ribbon of compliant fibrous ceramic material.

11. The method of brazing two pieces of material together with brazing material as defined in claim 10, wherein said step of heating further comprises the steps of:

placing said edge sealed sandwich assembly in a chamber;

evacuating said chamber of air; and applying radiant energy to said edge sealed sandwich assembly.

12. A method of brazing of two pieces of single crystal silicon material in a butt joint, said pieces each having a flat butting surface of the same predetermined size and area at which said butt joint is formed, comprising the steps of:

sandwiching a sheet of brazing material in between said butting surfaces of said pieces to form a sandwich assembly and holding said sandwich assembly together in sandwiched relationship, whereby the edges of said sheet of brazing material defines a seam about said sandwich assembly, said sheet of brazing material being of the same size and area as said flat butting surfaces of said two pieces;

wrapping a ribbon of a compliant compressible fibrous ceramic material impermeable to said brazing material completely about the outer periphery of said sandwich assembly in overlying relationship of said seam, said ribbon being of a width that is greater than the thickness of said sheet of brazing material;

compressing said ribbon against said sandwich assembly to place said ribbon in compression against said seam, and maintaining said ribbon in compression;

heating said sandwich assembly to the brazing temperature of said brazing material for a predetermined time to liquefy said brazing material, while maintaining said sandwich assembly in sandwiched relationship and said ribbon in compression.

13. A method of brazing of two pieces of low-wetting material which includes the steps of:

forming an assembly of said two pieces with brazing material sandwiched there between;

mechanically binding the edges of said brazing material in said assembly with a material that is not wettable by said brazing material; and then heating said assembly to the brazing temperature of said brazing material.

* * * * *